(12) United States Patent
Huemer et al.

(10) Patent No.: US 10,371,800 B2
(45) Date of Patent: Aug. 6, 2019

(54) RADAR DEVICE WITH NOISE CANCELLATION

(71) Applicant: InfineonTechnologies AG, Neubiberg (DE)

(72) Inventors: Mario Huemer, Alkoven (AT);
Alexander Melzer, Gralla (AT);
Alexander Onic, Linz (AT); Florian Starzer, Ennsdorf Bei Enns (AT);
Rainer Stuhlberger, Puchenau (DE)

(73) Assignee: Infineon Technologies AG, Neubiberg (DE)

( * ) Notice: Subject to any disclaimer, the term of this patent is extended or adjusted under 35 U.S.C. 154(b) by 762 days.

(21) Appl. No.: 14/993,557

(22) Filed: Jan. 12, 2016

(65) Prior Publication Data

US 2017/0199270 A1   Jul. 13, 2017

(30) Foreign Application Priority Data

Jan. 20, 2015   (DE) .......................... 10 2015 100 804

(51) Int. Cl.
*G01S 7/03*   (2006.01)
*G01S 7/35*   (2006.01)
(Continued)

(52) U.S. Cl.
CPC ............ *G01S 7/4021* (2013.01); *G01S 7/038* (2013.01); *G01S 7/352* (2013.01); *G01S 7/4056* (2013.01);
(Continued)

(58) Field of Classification Search
CPC ........ G01S 7/4021; G01S 7/038; G01S 7/352; G01S 7/4056; G01S 2007/4069; G01S 13/343
(Continued)

(56) References Cited

U.S. PATENT DOCUMENTS 3,128,462 A * 4/1964 Woolfson .............. G01S 7/4021
  331/16
5,055,850 A * 10/1991 Lamper ................. G01S 13/282
  342/201
(Continued)

FOREIGN PATENT DOCUMENTS

JP      2001141811 A   *  5/2001   .......... G01S 13/325
KR   20120116335 A   * 10/2012   ............ G01S 13/42

*Primary Examiner* — Peter M Bythrow
*Assistant Examiner* — Nuzhat Pervin
(74) *Attorney, Agent, or Firm* — Schiff Hardin LLP (57) ABSTRACT

Exemplary embodiments disclosed herein relate to a radar device. The radar device may transmit an RF oscillator signal to a radar channel and receive a respective first RF radar signal from the radar channel. The radar device may further generate a second RF radar signal. Frequency conversion circuits are also disclosed to down-convert the first RF radar signal and the second RF radar signal. An analog-to digital conversion unit may digitize the down-converted first RF radar signal and the down-converted second RF radar signal to generate a first digital signal and a second digital signal, respectively. A digital signal processing unit is disclosed to estimate a phase noise signal included in the second digital signal and to generate a cancellation signal based on the estimated phase noise signal. The cancellation signal is subtracted from the first digital radar signal to obtain a noise compensated digital radar signal.

16 Claims, 5 Drawing Sheets

(51) Int. Cl.
*G01S 7/40* (2006.01)
*G01S 13/34* (2006.01)

(52) U.S. Cl.
CPC ..... *G01S 13/343* (2013.01); *G01S 2007/4069* (2013.01)

(58) Field of Classification Search
USPC .......................................................... 342/168
See application file for complete search history.

(56) References Cited

U.S. PATENT DOCUMENTS

| | | | | |
|---|---|---|---|---|
| 5,138,325 A | * | 8/1992 | Koury | G01S 7/4052 342/169 |
| 5,189,427 A | * | 2/1993 | Stove | G01S 7/4056 342/128 |
| 5,828,333 A | * | 10/1998 | Richardson | G01S 7/023 342/70 |
| 6,054,948 A | * | 4/2000 | Dean | G01S 7/032 342/372 |
| 6,067,861 A | * | 5/2000 | Shekarriz | G01F 1/663 367/89 |
| 7,075,378 B2 | * | 7/2006 | Howe | H03B 5/1817 331/107 DP |
| 8,258,877 B2 | * | 9/2012 | Goel | H03F 3/45188 327/154 |
| 8,718,115 B2 | * | 5/2014 | Dabak | H04B 3/542 370/206 |
| 2004/0006436 A1 | * | 1/2004 | Morgen | G01F 1/663 702/48 |
| 2006/0203324 A1 | * | 9/2006 | Harris | G02F 1/116 359/278 |
| 2008/0062405 A1 | * | 3/2008 | Hill | B82Y 10/00 356/73 |
| 2008/0088503 A1 | * | 4/2008 | Beasley | G01S 7/4056 342/200 |
| 2009/0322578 A1 | * | 12/2009 | Petrovic | H04B 1/0039 341/155 |
| 2010/0265121 A1 | * | 10/2010 | Bandhauer | G01S 7/2923 342/135 |
| 2011/0102246 A1 | * | 5/2011 | Moulton | G01S 7/032 342/159 |
| 2012/0092205 A1 | * | 4/2012 | Bourdelais | G01S 7/282 342/21 |
| 2015/0378017 A1 | * | 12/2015 | Ferguson | G01S 13/882 342/120 |

* cited by examiner

RADAR DEVICE WITH NOISE CANCELLATION

TECHNICAL FIELD

The present disclosure generally relates to the field of radar sensor systems and devices, and signal processing employed in such systems and devices. In particular, the invention relates to the cancellation of noise caused by undesired radar echoes from short range (SR) targets (also referred to as short-range leakage).

BACKGROUND

Radar systems are well-known in the art, and can generally be divided into pulse radar systems and continuous-wave (CW) systems. A pulse radar system measures a distance to an object (usually referred to as target) by transmitting a short radio-frequency (RF) pulse to an object, and measuring the time taken for the reflected pulse (i.e. the echo) to be received. As the velocity of the pulse is known (i.e. the speed of light), it is straightforward to calculate the distance to an object. However, pulse radar systems are not suitable for use measuring distances of a few 100 meters, in particular because the pulse length must be reduced as the travel time (i.e. distance to the target) decreases. As the pulse length decreases, the energy contained within the pulse decreases, to the point where it becomes impossible to detect the reflected signal. Instead, continuous-wave radar systems are used for measuring comparably short distances. In many applications, such as in automotive applications, so-called frequency modulated continuous-wave (FMCW) radar systems are used to detect targets in front of the radar device and measure the distance to the target as well as their velocity.

Different from pulsed radar systems, in which isolation between the transmit signal path and the receive signal path is not specifically relevant due to the pulsed operation of the transmitter, a phenomenon referred to as leakage is an issue in FMCW radar systems. Leakage generally describes the problem that a small fraction of the frequency-modulated transmit signal "leaks" into the receive signal path of the radar transceiver without being back-scattered by a target. If the cause of the leakage is in the RF frontend of the radar transceiver (i.e. imperfect isolation of the circulator, which separates receive signal and transmit signal in a monostatic radar configuration) leakage is also referred to as crosstalk between the transmit signal path and the receive signal path. When integrating the radar system in one single monolithic microwave integrated circuit (MMIC) crosstalk or so-called on-chip leakage is always an issue.

Another cause of leakage may be objects, which are very close to the radar antenna (such as, e.g., a fixture or a cover mounted a few centimeters in front of the radar antennas). Herein, reflections of the transmitted radar signal at such objects are referred to as short-range leakage, which is a fraction of the transmit signal emanating from the transmit antenna and reflected back (back-scattered) to the receive antenna of the FMCW radar system at the mentioned objects, which are very close to the radar antenna(s). It shall be understood that the transmit antenna and the receive antenna are physically the same antenna in monostatic radar systems. Herein, the mentioned reflections caused by short-range targets are referred to as short-range leakage as their effect is similar to the effect of on-chip leakage. However, known methods, which are suitable for the cancellation of on-chip leakage or cross-talk are not suitable for the cancellation of short-range leakage.

In radar systems the overall noise floor limits the sensitivity, with which radar targets can be detected, and thus also limits the accuracy of the distance measurement. Generally, this noise floor is dominated by the additive noise of the transmission channel. However, in case a short-range target reflects the transmitted radar signal with comparably high amplitude (i.e. causes short-range leakage) the phase noise (PN) of the transmitted radar signal may dominate the noise floor. The phase noise results in a deteriorated signal detection quality or even makes the detection of radar targets with small radar cross sections impossible.

SUMMARY

Exemplary embodiments disclosed herein relate to a radar device. In accordance with one example of the present invention the radar device includes an RF transceiver configured to transmit an RF oscillator signal to a radar channel and receive a respective first RF radar signal from the radar channel. The radar device further includes an artificial radar target composed of circuitry that provides a gain and a delay to the RF oscillator signal to generate a second RF radar signal. A first frequency conversion circuit, which includes a first mixer, is configured to down-convert the first RF radar signal, and a second frequency conversion circuit, which includes a second mixer, is configured to down-convert the second RF radar signal. An analog-to digital conversion unit is configured to digitize the down-converted first RF radar signal and the down-converted second RF radar signal to generate a first digital signal and a second digital signal, respectively. A digital signal processing unit receives the first and second digital signals and is configured to estimate a phase noise signal included in the second digital signal and to generate a cancellation signal based on the estimated phase noise signal. The cancellation signal is subtracted from the first digital radar signal to obtain a noise compensated digital radar signal.

Other exemplary embodiments of the present invention relate to a method for cancelling noise in a radar signal. In accordance with one example of the invention the method includes transmitting an RF oscillator signal to a radar channel and receive a respective first RF radar signal from the radar channel, and applying the RF oscillator signal to an artificial radar target composed of circuitry, which applies a delay and a gain to the RF oscillator signal, to generate a second RF radar signal. The first RF radar signal and the second RF radar signal are down-converted from a RF frequency band to a base band, and the down-converted first RF radar signal and the down-converted second RF radar signal are digitized to generate a first digital signal and a second digital signal, respectively. Moreover, the method includes estimating a phase noise signal included in the second digital signal, and generating a cancellation signal based on the estimated phase noise signal. The cancellation signal is subtracted from the first digital radar signal to obtain a noise compensated digital radar signal.

BRIEF DESCRIPTION OF THE DRAWINGS

The invention can be better understood with reference to the following drawings and descriptions. The components in the figures are not necessarily to scale; in-stead emphasis is placed upon illustrating the principles of the invention. More-over, in the figures, like reference numerals designate corresponding parts. In the drawings.

DETAILED DESCRIPTION OF THE EMBODIMENTS

Figure 1:
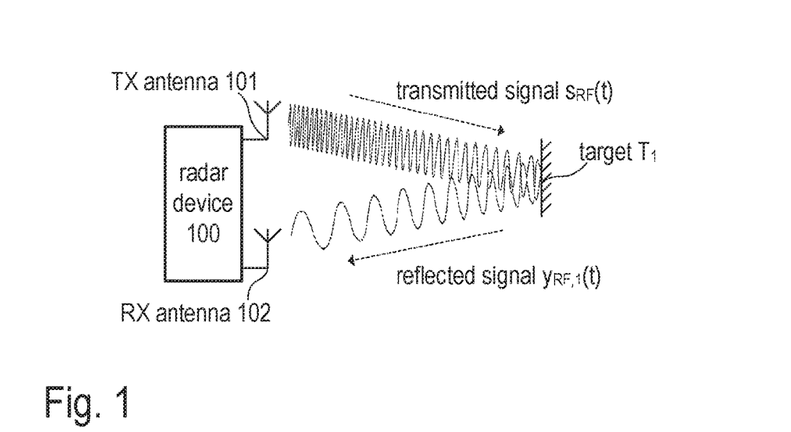
FIG. 1 is a schematic diagram illustrating the operating principle of a FMCW radar sensor with a single radar target in the transmission channel.
Figure 2:
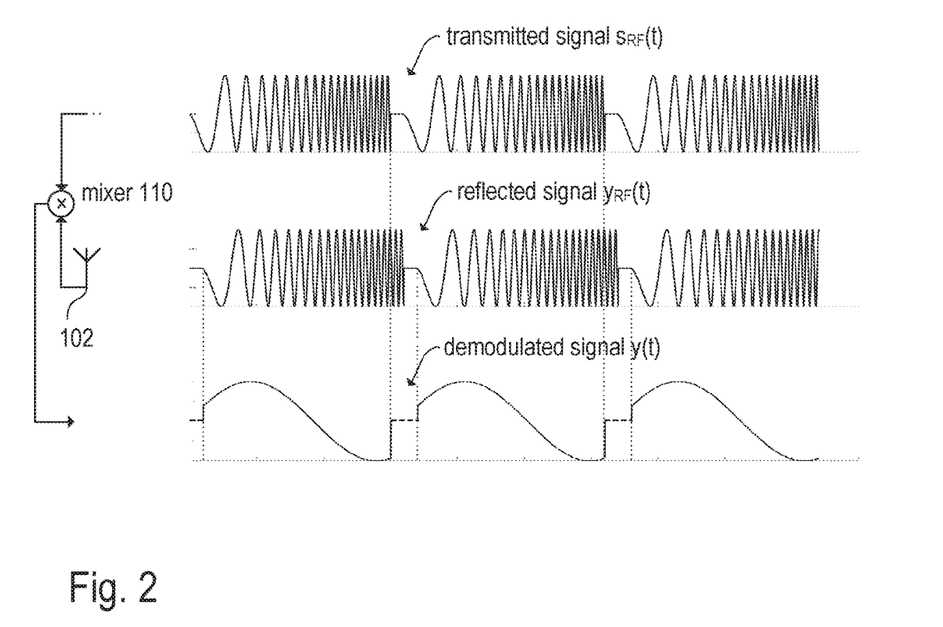
FIG. 2 illustrates the waveform of the transmitted and reflected radar signals in the radar sensor of FIG. 1.

FIG. 1 illustrates a conventional frequency-modulated continuous-wave (FMCW) radar system 100. In the present example, separate transmit (TX) and receive (RX) antennas 101 and 102, respectively, are used. However, it shall be understood that a single antenna can be used so that the receive antenna and the transmit antenna are physically the same (monostatic radar configuration). The transmit antenna continuously radiates a sinusoidal RF signal $s_{RF}(t)$, which is frequency-modulated, for example, by a saw-tooth signal (periodic linear ramp signal). The transmitted signal $s_{RF}(t)$ is back-scattered at a target $T_1$, which is located within the measurement range of the radar system, and received by receive antenna 102. The received signal is denoted as $y_{RF}(t)$. In the radar device 100, the received signal $y_{RF}(t)$ is demodulated by mixing the signal $y_{RF}(t)$ with a copy of the transmit signal $s_{RF}(t)$ to effect a down-conversion of the RF signal $y_{RF}(t)$ into the base band. This down-conversion is illustrated in FIG. 2. The received RF signal $y_{RF}(t)$ lags behind the transmit signal $s_{RF}(t)$ due to the time taken for the signal to travel to and from the target $T_1$. As a consequence, there is a constant frequency difference between the received RF signal $y_{RF}(t)$ and the reference signal (i.e. the copy of the transmit signal $s_{RF}(t)$). When the two signals $s_{RF}(t)$ and $y_{RF}(t)$ are mixed (i.e. demodulated), a demodulated signal y(t) of constant frequency (in case of a linear frequency modulation) is obtained (also referred to as beat frequency). The beat frequency of the received and demodulated signal y(t) can be determined (e.g. using Fourier analysis) and used to calculate the distance between the radar device 100 and the target $T_1$.

Figure 3:
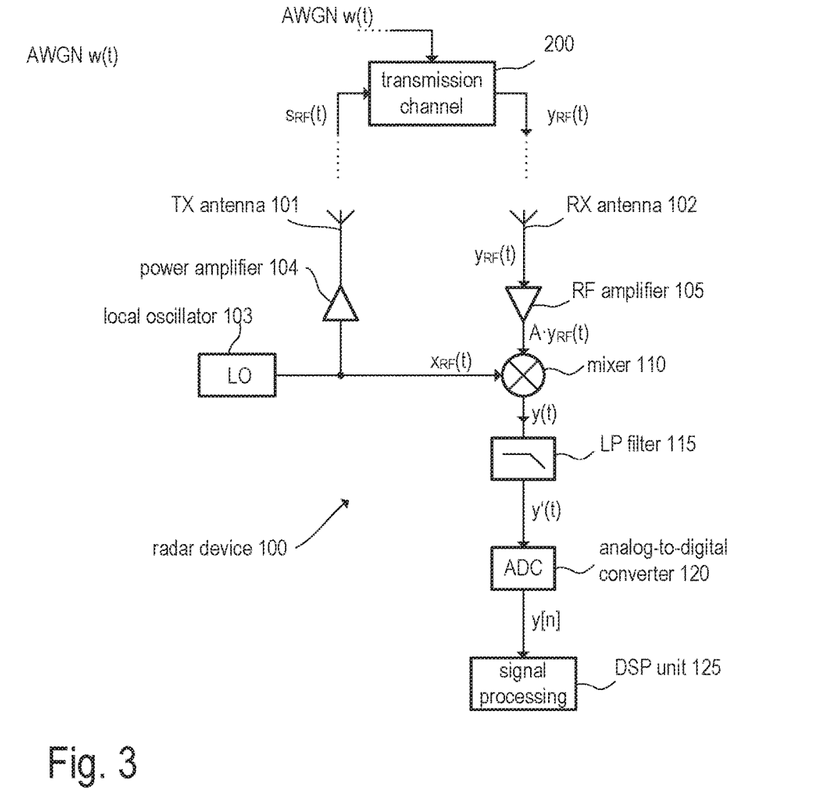
FIG. 3 is a block diagram illustrating the function of the radar sensor of FIG. 1.

The radar device 100 may include or be implemented in a monolithic microwave integrated circuit (MMIC), which includes circuitry for providing the core functions needed for distance and/or velocity measurement in one chip (also referred to as "single chip radar"). Thus the chip may include, inter alia, RF oscillators, amplifiers, mixers, filters, analog-to-digital converters, and digital signal processors. FIG. 3 illustrates the transmit path and the receive path of a radar transceiver, which may be used for distance measurement in a radar device 100 shown in FIG. 1. Accordingly, the RF transceiver 1 includes a mixer 110, which is supplied with radar signal $y_{RF}(t)$ and with RF oscillator signal $s_{RF}(t)$ used to down-convert the radar signal $y_{RF}(t)$ into the base band. The radar signal $y_{RF}(t)$ (i.e. a back scattered portion of the transmit signal $s_{RF}(t)$) is received by receive antenna 102 and may be pre-amplified (see RF amplifier 105) before being supplied to the mixer 110. In the present example, the RF oscillator signal $s_{RF}(t)$ is generated by a local oscillator (LO) 103, which may include a voltage controlled oscillator (VCO) coupled in a phase locked loop (PLL). However, the RF oscillator signal $s_{RF}(t)$ may be provided by other circuitry dependent on the actual application. When used in a radar distance measurement device, the RF oscillator signal $s_{RF}(t)$ may be in the range between approximately 24 GHz and 77 GHz (77 GHz in the present example). However, higher or lower frequencies may also be applicable. The RF oscillator signal $s_{RF}(t)$ is also supplied to transmit antenna 101 (e.g. via power amplifier 104) and radiated towards the radar target (see also FIG. 1).

As mentioned, the mixer 110 down-converts the radar signal (amplified antenna signal $A \cdot y_{RF}(t)$, amplification factor A) into the base band. The respective base band signal (mixer output signal) is denoted by y(t). The base band signal y(t) is then subject to analog filtering (filter 115) to suppress undesired sidebands or image frequencies, which may be a result of the mixing operation. The filter 115 may be a low-pass filter or a band-pass filter. The filtered base band signal (filter output signal) is denoted by y'(t). Receivers (or the receiver portions of transceivers) which make use of a mixer to down-convert the received RF signal into the base band are as such known as heterodyne receivers and thus not further discussed in more detail. The filtered base band signal y'(t) is then sampled (temporal discretization) and converted to a digital signal y[n] (analog-to-digital converter (ADC) 120), which is then further processed in the digital domain using digital signal processing (n being the time index). The digital signal processing may be performed in a digital signal processing unit 125, which may include, e.g., a digital signal processor (DSP) executing appropriate software instructions.

FIG. 3 illustrates the receive path of a radar transceiver 100' of a so-called bistatic or pseudo-monostatic radar system, in which the receiver may be separate from the transmitter (as receiver and transmitter use separate antennas). In the present example, the transmitter and the receiver portion of the radar transceiver are, however, integrated in one MMIC. In a monostatic radar system, the same antenna is used to transmit and receive RF radar signals. In such cases, the radar transceiver additionally includes a directional coupler or a circulator (not shown) coupled between the mixer for separating the RF transmit signal $s_{RF}(t)$ from the received signal $y_{RF}(t)$.

Figure 4:
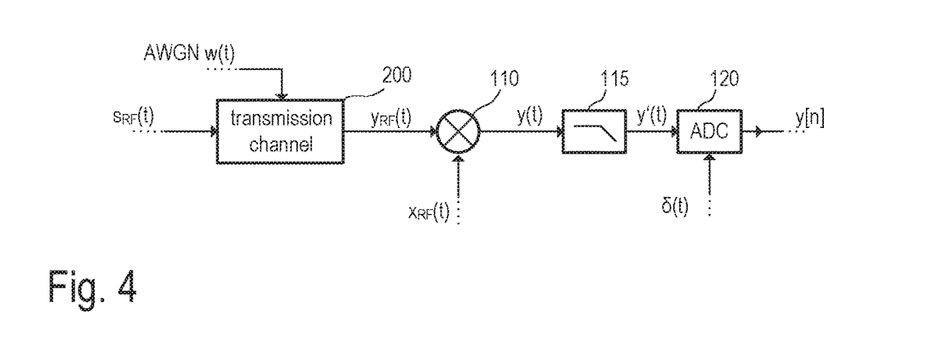
FIG. 4 is a simplified block diagram representing the basic function of a FMCW radar sensor.

The transmission channel 200 represents the signal path from the transmit antenna 101 to the target and back to the receive antenna 102. While passing through the transmission channel the radar signals $s_{RF}(t)$ (transmitted signal) and $y_{RF}(t)$ (back-scattered signal) are subject to additive noise w(t), which is usually modelled as additive white Gaussian noise (AWGN). FIG. 4 is a simplified block diagram illustrating the analog frontend of the radar transceiver shown in FIG. 3. To allow a simple and clear illustration, antennas and amplifiers have been omitted. Accordingly, the RF transmit signal $s_{RF}(t)$, which may be generated by local oscillator 103, is sent through transmission channel 200 and finally arrives (as received radar signal $y_{RF}(t)$) at the RF input of mixer 110, which is configured to down-convert the radar signal $y_{RF}(t)$ into the base band. The resulting base band signal y(t) is low-pass filtered (low-pass filter 115), and the filtered base band signal y'(t) is then digitized using analog-to-digital converter 120. Band-pass filtering may also be applicable instead of low-pass filtering. The digitized base band signal y[n] is then further processed digitally to estimate the distance between the transceiver 100' and the target. As mentioned additive white Gaussian noise is added to the radar signal while passing through the transmission channel 200.

Figure 5:
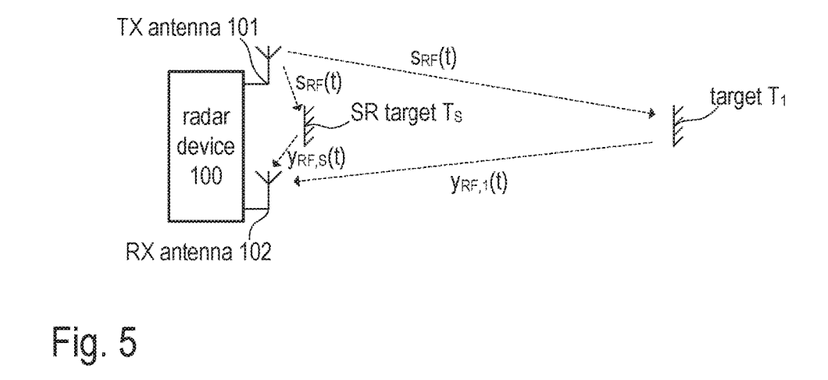
FIG. 5 is a schematic diagram illustrating the cause and origination of leakage by reflection at a short range target.

FIG. 5 is basically the same illustration as shown in FIG. 1 but with an additional object $T_S$ located in the transmission channel comparably close to the antennas (e.g., a fixture or a cover mounted in front of the radar antennas). Such objects are herein referred to as short-range targets. A short-range targets is usually located a few centimeters (e.g. less than 50 cm) in front of the radar device (which is less than the lower margin of the measurement range of the radar system) and reflects a portion of the transmit signal $s_{RF}(t)$ back to the receive antenna 102. As mentioned above, such reflections at short-range targets give rise to a phenomenon referred to as short-range leakage. In the example of FIG. 5, the transmitted RF signal $s_{RF}(t)$ is back-scattered at target $T_1$ (which is within the normal measurement range of the radar transceiver) as well as reflected at the short-range target $T_S$. The signal back-scattered from target $T_1$ is denoted as $y_{RF,1}(t)$ and the signal reflected at the short-range target $T_S$ is denoted as $y_{RF,S}(t)$. Both signals $y_{RF,1}(t)$ and $y_{RF,S}(t)$ superpose and the resulting sum signal $y_{RF}(t)$ is received by the antenna 102. Considering the fact that the received signal power decreases with the fourth power of the distance, the signal amplitude of the radar signal $y_{RF,S}(t)$ due to short-range leakage is significant. Furthermore, the phase noise of the transmitted radar signal $s_{RF}(t)$ is the dominant cause of noise in the received radar signal $y_{RF}(t)$ as a result of the short-range leakage.

Figure 6:
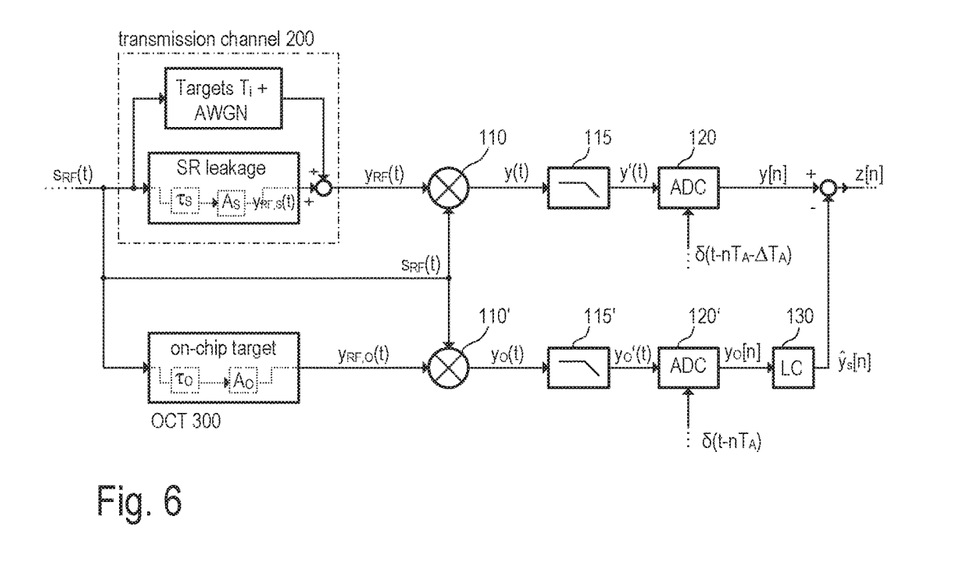
FIG. 6 is a block diagram illustrating a radar sensor with noise cancellation in accordance with one example of the present invention

FIG. 6 is a block diagram of a radar transceiver in accordance with one exemplary embodiment, which is configured to cancel short-range leakage and thus the mentioned phase noise from the received radar signal using digital signal processing in the base band and an artificial radar target 300 (further referred to as on-chip target or OCT). Again, antennas and amplifiers have been omitted in the illustration for the sake of simplicity and clarity. The transmit signal $s_{RF}(t)$ is a frequency-modulated continuous-wave (FMCW) signal (chirp-signal), also referred to as chirp signal. Accordingly, the signal $s_{RF}(t)$ can be written as:

$$s_{RF}(t)=\cos(2\pi f_0 t+\pi k t^2+\varphi(t)+\Phi), \quad (1)$$

wherein $f_0$ is the start frequency of the chirp signal, k (k=B/T) denotes the slope of the chirp with bandwidth B and duration T, $\Phi$ is a constant phase offset and $\varphi(t)$ is the introduced phase noise (PN) due to imperfections of the local oscillator (see FIG. 3).

The transmission channel 200 (see FIGS. 5 and 6) comprises of two types of signal reflections. Firstly, reflections (back-scattering) at targets $T_i$, whose distances from the radar transceiver is to be measured. These targets $T_i$ are modeled by a delay $\tau_{T_i}$ and gain $A_{T_i}$, wherein i=1, ..., $N_T$, and $N_T$ denotes the number of targets $T_i$ (not including the short-range target). Secondly, the reflection at a short-range target, which represents the undesired near target causing reflections (short-range leakage) which are to be cancelled. Analogously to a normal target the short-range target may be modeled by a delay $\tau_S$ and gain $A_S$. In practice, the gain $A_S$ will be significantly larger than any of the gains $A_{T_i}$. This model of the transmission channel 200 is depicted in the upper signal path of the block diagram of FIG. 6. At the receiver side, additive white Gaussian noise (AWGN) is added before down-conversion to the base band is done. Consequently, the received RF radar signal $y_{RF}(t)$ may be written as $$y_{RF}(T)=A_S \cdot s_{RF}(t-\tau_S)+\sum_{i=1}^{N_T} A_{T_i} \cdot s_{RF}(t-\tau_{T_i})+w(t), \quad (2)$$

wherein the first summand represents the signal component due to the short-range leakage, the second summand represents the signal components due to reflections at the "normal" radar target(s) and the last summand represents AWGN. The delays $\tau_S$ and $\tau_{T_i}$ are also referred to as round trip delay times (RTDT) associated with the short-range target and the targets $T_i$, respectively. It should be noted that, in the present disclosure, the previously mentioned on-chip leakage is not considered as several concepts for cancelling on-chip leakage exist.

As can be seen from FIG. 6, the received radar signal is subject to a down-conversion using the mixer 110 and a subsequent band-pass or low-pass filtering using the filter 115, which has a filter impulse response $h_F(t)$. As in the previous illustrations, the down-converted and filtered signal is denoted as y'(t), which can be modelled as follows (assuming $\Phi=0$ for the sake of simplicity):

$$y'(t) = \qquad (3)$$
$$(s_{RF}(t) \cdot y_{RF}(t)) * h_F(t) = \frac{A_S}{2} \cdot \cos(2\pi f_{BS} t + \Phi_S + \varphi(t) - \varphi(t-\tau_S)) +$$
$$\sum_{i=1}^{N_T} \frac{A_{T_i}}{2} \cdot \cos(2\pi f_{BT_i} t + \Phi_{T_i} + \varphi(t) - \varphi(t-\tau_{T_i})) + w(t).$$

The beat frequencies resulting from the short-range leakage and the reflections at the normal targets are denoted as $f_{BS}$ and $f_{BT_i}$ (for target $T_i$), respectively, and can be represented by the following equations:

$$f_{BS}=k\tau_S, \text{ and } f_{BT_i}=k\tau_{T_i}. \quad (4)$$

Furthermore, the constant phase $\Phi_S$ and $\Phi_{T_i}$ can be computed as $$\Phi_S=2\pi f_0 \tau_S+k\pi\tau_S^2, \text{ and } \Phi_{T_i}=2\pi f_0 \tau_{T_i}+k\pi\tau_{T_i}^2. \quad (5)$$

The beat frequencies (equations 4) and constant phases (equations 5) depend only on given system parameters (such as the start frequency $f_0$ of the chirp as well as its bandwidth and duration as represented by the variable k=B/T) and the RTDTs $\tau_S$ and $\tau_{T_i}$ associated with the short-range leakage and the radar targets $T_i$ to be detected, respectively. It follows from equations 3, 4 and 5 that the signal component of y'(t), which results from the short-range leakage (i.e. the first summand in equation 3), is zero when the RTDT $\tau_S$ is zero ($\tau_S=0$). Even the term $\varphi(t)-\varphi(t-\tau_S)$ becomes zero when the delay time $\tau_S$ is zero. With increasing values of the RTDT $\tau_S$ (i.e. with increasing distance of the short-range target) the correlation of the phase noise components $\varphi(t)$ and $\varphi(t-\tau_S)$ decreases. This effect is called range correlation effect and the phase difference $\varphi(t)-\varphi(t-\tau_S)$ is referred to as decorrelated phase noise DPN. It is noted that DPN is usually not an issue in the context of on-chip leakage as the associated delay is negligibly small.

In the following, the first summand of equation 3, i.e. the short-range leakage signal $$y'_S(t) = \frac{A_S}{2} \cdot \cos(2\pi f_{BS} t + \Phi_S + \varphi(t) - \varphi(t-\tau_S)) \quad (6)$$

is analyzed in more detail (see FIG. 6). In equation 6, the gain $A_S/2$ is primarily determined by the radar cross section (RCS) of the short-range target. Generally, the RCS may depend on the shape and the material of the short-range target. The beat frequency $f_{BS}$ (see equation 4) depends on the RTDT $\tau_S$ associated with the short-range target. The RTDT $\tau_S$ depends on the distance $d_S$ between the radar device and the short-range target. Accordingly, the distance $d_S$ can be calculated as $d_S = c \cdot \tau_S / 2$, wherein c denotes the speed of light. In equation 6, the DPN $\varphi(t) - \varphi(t - \tau_S)$ represents noise in addition to the mentioned AWGN. To analyze how the DPN affects the spectrum of the received radar signal, the power spectrum $S_{\Delta\varphi}$ of the DPN is calculated:

$$S_{\Delta\varphi}(f) = S_\varphi(f) \cdot 2(1 - \cos(2\pi\tau_S f)), \tag{7}$$

wherein $S_\nu(f)$ is the power spectrum of the phase noise signal $\varphi(t)$ included in the RF transmit signal $s_{RF}(t)$. Further analysis of a realistic example ($\tau_S = 800$ ps, $d_S \approx 12$ cm) shows that, for frequencies higher than 100 kHz, the noise level of the DPN is −140 dBm, assuming a transmit power of 10 dBm and an AWGN noise floor of −140 dBm. The presence of DPN entails an increase of the noise floor and results in a 10 dB reduction of sensitivity for the detection of radar targets. As a result, the total noise floor increases, which is equivalent to a loss of sensitivity of 10 dB for the detection of radar targets.

To at least reduce the effect of the DPN due to (unavoidable) short-range targets an (artificial) on-chip target (OCT) is included in the radar device and incorporated in the signal processing chain as illustrated in FIG. 6. The OCT is used to obtain an estimation of the DPN and to (at least partially) cancel the DPN from the received radar signal in the base band. As can be seen from FIG. 6, the RF transmit signal $s_{RF}(t)$ is (in addition to being radiated to the radar channel 200) supplied to OCT 300 that is basically composed of a gain $A_O$ ($A_O < 1$) and a delay $\tau_O$, which can be seen as an on-chip RTDT. The RF signal received from OCT 300 is denoted as $y_{RF,O}(t)$. This signal $y_{RF,O}(t)$ is down-converted into the base band (mixer 110') and band-pass filtered (filter 115') in the same manner as the RF signal $y_{RF}(t)$ received from the radar channel 200. The down-converted signal received from OCT 300 is denoted as $y_O(t)$ and the respective band-pass (or low-pass) filtered signal is denoted as $y_O'(t)$. Both, the filtered base band signal $y'(t)$ received from radar channel 200 and the filtered base band signal $y_O'(t)$ received from OCT 300 are digitized using analog-to-digital converters 120 and 120', respectively, for further digital signal processing. In another embodiment a single analog-to-digital converter and a multiplexer may be used to provide the same function. The respective digital signals are denoted as y[n] and $y_O$[n].

Theoretically, it would be desirable that the delay $\tau_O$ of OCT 300 equals the RTDT $\tau_S$ of the short-range target present in radar channel 200. In realistic examples the RTDT $\tau_S$ of the short-range target is in the range of a few hundreds of picoseconds up to a few nanoseconds, whereas the delay $\tau_O$ of an on-chip target is practically limited to a few picoseconds when implementing the radar device on a single MMIC. In a single-chip radar higher values of delay $\tau_O$ (which would be needed in case of $\tau_O = \tau_S$) would result in an undesired (or even unrealistic) increase in chip area and power consumption and are thus only economically feasible when using discrete circuit components. Therefore, the delay $\tau_O$ of OCT 300 is limited to values that are significantly lower than the RTDT $\tau_S$ of any practically relevant short-range target.

Further analysis of the properties of the cross-correlation coefficient of the decorrelated phase noise (DPN) signals $$\Delta\varphi_S(t) = \varphi(t) - \varphi(t - \tau_S), \tag{8}$$

i.e. the DPN included in the RF signal received from the short-range target $T_S$ (see FIGS. 5 and 6), and $$\Delta\varphi_O(T) = \varphi(t) - \varphi(t - \tau_O) \tag{9}$$

i.e. the DPN included in the RF signal received from OCT 300, shows that the cross-correlation coefficient $$P_{\Delta\varphi_O, \Delta\varphi_S}(l) = \frac{E\{\Delta\varphi_O(t) \Delta\varphi_S(t-l)\}}{\sqrt{\sigma^2_{\Delta\varphi_O}} \sqrt{\sigma^2_{\Delta\varphi_S}}} \tag{10}$$

is very similar for different values of OCT delay $\tau_O$ (the operator E denoting the expected value and $\tau_{\Delta\varphi_O}^2$ and $\tau_{\Delta\varphi_S}^2$ are the respective variances). Note that the DPN terms are assumed to have a mean value of zero. For an OCT delay $\tau_O$ equal to the RTDT $\tau_S$, the cross-correlation coefficient assumes a maximum for a time lag of zero (l=0). For smaller values of $\tau_O$ (i.e. $\tau_O < T_S$) the cross-correlation coefficient is scaled and shifted as compared to the case when $\tau_O = \tau_S$. This result is illustrated in the diagrams of FIGS. 7 and 8.

Figure 7:
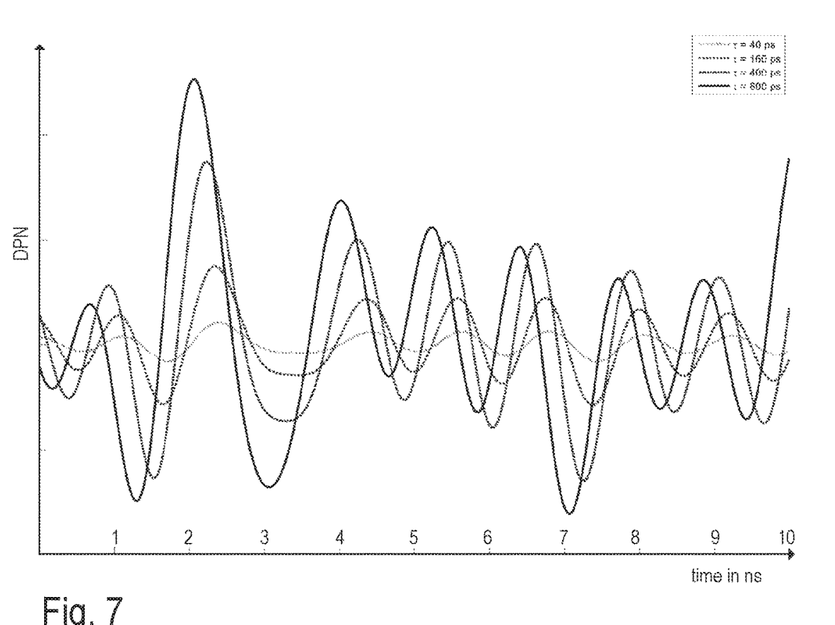
FIG. 7 is a diagram illustrating the decorrelated phase noise for different delay times.
Figure 8:
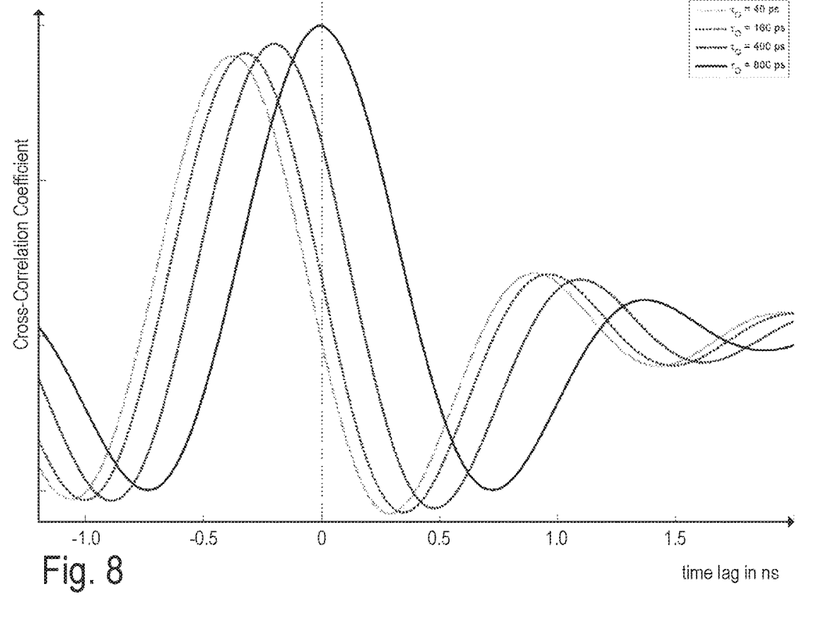
FIG. 8 is a diagram illustrating the cross-correlation coefficient between the decorrelated phase noise included in short-range leakage and the decorrelated phase noise included in the signal obtained from an artificial on-chip target.

FIG. 7 illustrates exemplary realizations of a DPN signal $\Delta\varphi(t) = \varphi(t) - \varphi(t - \tau)$ for different delay times $\tau$. The DPN signals $\Delta\varphi(t)$ shown in FIG. 7 (for $\tau = 40$ ps, $\tau = 160$ ps, $\tau = 400$ ps, and $\tau = 800$ ps) have been obtained by simulating the phase noise $\varphi(t)$ using a stochastic model, which models the phase noise of the local oscillator (see FIG. 3, LO 103). It can be seen from FIG. 7 that the waveforms of the resulting DPN signals are very similar, even when the delay time r is different. In this context similar means that one waveform (e.g. for $\tau = 40$ ps) can be transformed into any other waveform (e.g. the waveform for $\tau = 800$ ps) by applying a gain and a time-shift (or phase-shift). This fact can also be observed in the cross-correlation coefficient shown in FIG. 8. Equation 10 has been estimated with a discrete-time simulation, wherein the expected value (operator E) has been approximated over an representative length of the random signals (obtained using the mentioned stochastic model) representing phase noise signal $\varphi(t)$.

As the DPN $\varphi_O(t)$ included in the down-converted RF signal $$y_O(t) = \frac{A_O}{2} \cdot \cos(2\pi f_{BO} t + \Phi_O + \varphi(t) - \varphi(t - \tau_O)) \tag{11}$$

received from OCT 300 and the DPN $\varphi_S(t)$ included in the baseband signal $y_S(t)$ received from the short-range target (see equation 6) are highly correlated, the DPN included in the baseband signal $y_O(t)$ obtained from OCT 300 can be used to estimate the DPN caused by the short-range leakage. In equation 11 $f_{BO}$ denotes the beat frequency caused by OCT 300 and is calculated analogously to $f_{BS}$ (see equation 4). Also the constant phase $\Phi_O$ is computed in an analogous manner as constant phase $\Phi_S$ (see equations 5 and 14). In a practical example the RTDT $\tau_S$ associated with the short-range target $T_S$ is approximately 800 ps (corresponds to $d_S = 12$ cm), whereas the OCT delay time $\tau_O$ is only 40 ps. Therewith, the beat frequency $f_{BS}$ is 20 times higher than beat frequency $f_{BO}$.

As can be seen from FIG. 6, the sampling clock signal, which triggers the sampling of the upper signal path (i.e. the sampling of signal y'(t) received from channel 200), is delayed by a time offset $\Delta T_A$. This time offset of the sampling clock signal may be chosen equal to the time lag I, at which the cross-correlation coefficient (see equation 10 and FIG. 8) has its maximum for a specific RTDT $\tau_O$, wherein $\tau_O < \tau_S$. Further analysis of the cross-correlation coefficient shows that the optimum sampling time offset $\Delta T_A$ is equal to half of the difference $\tau_S - \tau_O$, that is $$\Delta T_A = \frac{\tau_S - \tau_O}{2}. \tag{12}$$

Using the mentioned sampling time offset for maximization of the correlation coefficient results in a high correlation coefficient $\rho_{\Delta\varphi_O,\Delta\varphi_S}(0)$ of, for example, 0.9 for $\tau_S=800$ ps and $\tau_O=40$ ps (see diagram of FIG. 8).

As the DPN signals included in the discrete time signals y[n] and $y_O[n]$ (provided by analog-to-digital converters 120 and 120', respectively) are highly correlated (particularly when using the mentioned sampling time offset), an estimation of the discrete-time DPN signal $\Delta\varphi_O[n]$ may be calculated from the down-converted signal $y_O[n]$ obtained from OCT 300. This estimation and the subsequent calculation of a corresponding cancellation signal is performed by the function block 130 labelled LC (leakage cancellation). Therefore, the LC function block basically provides the two functions of estimating the DPN from signal $y_O[n]$ and generating a cancellation signal $\hat{y}_S[n]$ to be subtracted from the down-converted and digitized radar signal y[n] in order to eliminate the short-range leakage (see also equation 6) included in the radar signal y[n].

The discrete-time version of equation 11 is $$y_O[n] = \frac{A_O}{2} \cdot \cos(2\pi f_{BO} n T_A + \Phi_O + \Delta\varphi_O[n]) \tag{13}$$

with $$f_{BO} = k\tau_O, \text{ and } \Phi_O = 2\pi f_0 \tau_O + k\pi\tau_O^2 \tag{14}$$

wherein $f_S$ is the sampling rate determined by the period $T_A$ of the sampling clock signal ($f_A = T_A^{-1}$). Applying the trigonometric identity $$\cos(a+b) = \cos(a)\cos(b) + \sin(a)\sin(b) \tag{15}$$

and the approximations (since $\Delta\varphi_O[n]$ is sufficiently small)

$$\cos(\Delta\varphi_O[n]) \approx 1 \text{ and} \tag{16}$$

$$\sin(\Delta\varphi_O[n]) \approx \Delta\varphi_O[n] \tag{17}$$

to equation 13 simplifies it to $$y_O[n] \approx \tag{18}$$

$$\frac{A_O}{2} \cdot \cos(2\pi f_{BO} n T_A + \Phi_O) + \frac{A_O}{2} \cdot \sin(2\pi f_{BO} n T_A + \Phi_O) \cdot \Delta\varphi_O[n].$$

As the gain $A_O$ and the beat frequency $f_{BO}$ are a-priori known system parameters of the radar system the DPN $\Delta\varphi_O[n]$ can be approximated based on the down-converted signal $y_O[n]$, which is received from the OCT, in accordance with the following equation:

$$\Delta\varphi_O[n] \approx \frac{y_O[n] - \frac{A_O}{2} \cdot \cos(2\pi f_{BO} n T_A + \Phi_O)}{\frac{A_O}{2} \cdot \sin(2\pi f_{BO} n T_A + \Phi_O)}. \tag{19}$$

Beat frequency $f_{BO}$ and phase $\Phi_O$ may be measured after production of the radar device as a part of a system test and calibration procedure. These parameters can be computed in the same manner as for the short-range leakage signal $y_S[n]$ (see equations 4 and 5 and equation 14). In order to account for parameter variations of OCT 300 (e.g. due to temperature changes) beat frequency $f_{BO}$ and phase $\Phi_O$ may be estimated repeatedly and updated regularly.

In an alternative embodiment, the DPN may be obtained by applying a high-pass filter to the signals $y_O[n]$ as the phase noise is dominant in the range of a few hundred kHz. In essence, the high-pass filter can eliminate the first summand in equation 18.

As the DPN signals $\Delta\varphi_O[n]$ and $\Delta\varphi_S[n]$ are highly correlated, the short-range leakage signal (cf. equation 6)

$$y_S[n] = \frac{A_S}{2} \cdot \cos(2\pi f_{BS} n T_A + \Phi_S + \Delta\varphi_S[n]) \tag{20}$$

can be approximated as $$\hat{y}_S[n] = \frac{\hat{A}_S}{2} \cdot \cos(2\pi \hat{f}_{BS} n T_A + \hat{\Phi}_S + \alpha \cdot \Delta\varphi_O[n]), \tag{21}$$

where $\alpha$ is referred to as DPN gain. Gain $\alpha$ can be determined with the help of the auto-covariance function $$c_{\Delta\varphi_S,\Delta\varphi_S}(l) = E\{\Delta\varphi_S(t)\Delta\varphi_S(t-l)\}. \tag{22}$$

and the cross-covariance function $$c_{\Delta\varphi_O\Delta\varphi_S}(l) = E\{\Delta\varphi_O(t)\Delta\varphi_S(t-l)\}. \tag{23}$$

The DPN gain $\alpha$ can then be determined as $$\alpha = \frac{c_{\Delta\varphi_S\Delta\varphi_S}(0)}{c_{\Delta\varphi_O\Delta\varphi_S}(-\Delta T_A)}. \tag{24}$$

Note that the numerator equals equation 23 (resulting in $\alpha=1$) when $\tau_O = \tau_S$ (see also FIG. 8, in which the cross-correlation coefficient has a maximum of 1 for $\tau_O = \tau_S$ and maxima lower than 1 for $\tau_O < \tau_S$). Therewith, $\alpha$ is a measure of how much the DPN of the OCT needs to be amplified such that it approximates the DPN of the SR leakage. For example, with a typical phase noise power spectrum, $\tau_S = 800$ ps and $\tau_O = 40$ ps results in a DPN gain of $\alpha = 13.1$.

The estimated short-range leakage signal $\hat{y}_S[n]$ is generated by the LC function block 130 illustrated in FIG. 6. The actual noise cancellation is accomplished by subtracting the estimated short-range leakage signal $\hat{y}_S[n]$ from the signal y[n] received from the radar channel. The DPN compensated signal is denoted as z[n] and is calculated as $$z[n] = y[n] - \hat{y}_S[n]. \tag{25}$$

Figure 9:
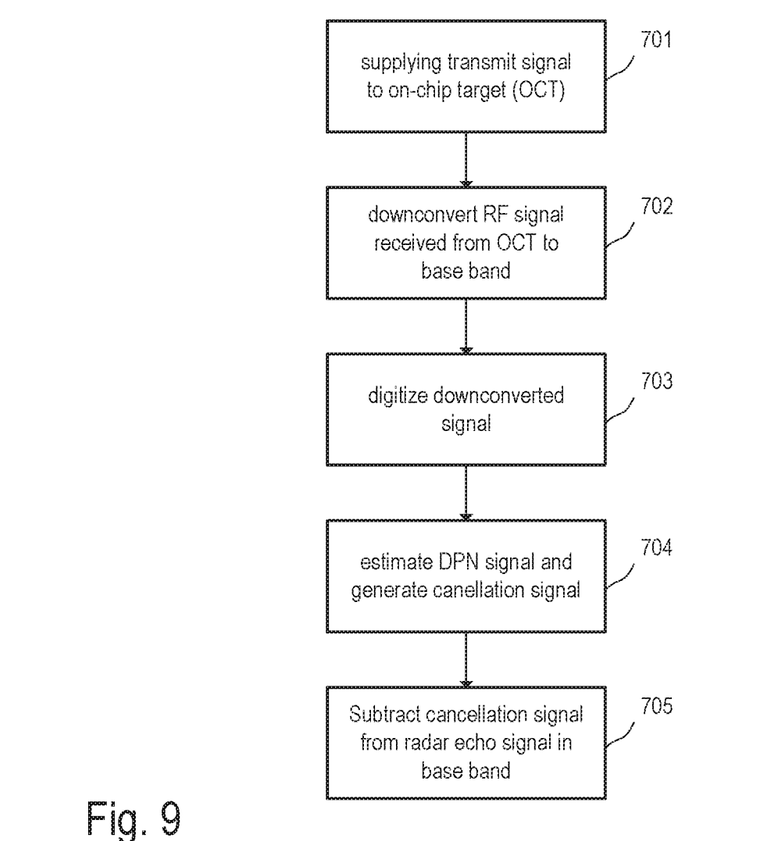
FIG. 9 is a flow chart illustrating noise cancellation in accordance with another example of the present invention.

The cancellation method is summarized in the flow-chart of FIG. 9. As compared to a known radar system the RF transmit signal $s_{RF}(t)$ is transmitted to an on-chip target (OCT) 300 (see step 701). The signal $y_{RF,O}(t)$ received from OCT 300 down-converted to the base band (base band signal $y_O(t)$, step 702) and digitized (digital base band signal $y_O[n]$, step 703). The decorrelated phase noise (DPN) signal $\Delta\varphi_O[n]$ is estimated from digitized signal $y_O(t)$, and a corresponding cancellation signal $\hat{y}_S[n]$ is generated based on the estimated DPN signal $\Delta\varphi_O[n]$ (step 704). Finally, the cancellation signal is subtracted from the (down-converted and digitized) radar echo signal $y[n]$ in order to compensate for the short-range leakage included therein.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond unless otherwise indicated to any component or structure, which performs the specified function of the described component (e.g., that is functionally equivalent), even though not structurally equivalent to the disclosed structure, which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A radar device comprising:
   an RF transceiver configured to transmit an RF oscillator signal to a radar channel and receive a respective first RF radar signal from the radar channel;
   an artificial radar target composed of circuitry that provides a gain and a delay to the RF oscillator signal to generate a second RF radar signal;
   a first frequency conversion circuit that includes a first mixer configured to down-convert the first RF radar signal;
   a second frequency conversion circuit that includes a second mixer configured to down-convert the second RF radar signal;
   an analog-to digital conversion circuitry configured to digitize the down-converted first RF radar signal and the down-converted second RF radar signal to generate a first digital signal and a second digital signal, respectively;
   a digital signal processing circuitry configured to receive the first and second digital signals, and further configured to:
      estimate a phase noise signal included in the second digital signal, the phase noise signal approximating phase noise in the radar channel associated with short-range leakage;
      generate a cancellation signal based on the estimated phase noise signal; and
      subtract the cancellation signal from the first digital signal to obtain a noise compensated digital radar signal.

2. The radar device of claim 1, wherein, to estimate a phase noise signal, the digital signal processing circuitry is configured to:
   calculate an estimation of the phase noise signal dependent on the gain and the delay of the artificial radar target and dependent on signal parameters of the RF oscillator signal.

3. The radar device of claim 2, wherein the RF oscillator signal is a sequence of chirps and the signal parameters of the RF oscillator signal are a start frequency, a bandwidth, and a duration of the chirps.

4. The radar device of claim 1, wherein, to estimate a phase noise signal, the digital signal processing circuitry is configured to:
   calculate an estimation of the phase noise signal in accordance with the following equation:

$$\Delta\varphi_O[n] \approx \frac{y_O[n] - \frac{A_O}{2} \cdot \cos(2\pi f_{BO} n T_A + \Phi_O)}{\frac{A_O}{2} \cdot \sin(2\pi f_{BO} n T_A + \Phi_O)},$$

wherein n is a time index, $T_A$ is a sampling period of the analog-to digital conversion circuitry, $\Delta\varphi_O$ is the phase noise signal, $y_O[n]$ is the second digital signal, $A_O$ is the gain of the artificial radar target, $f_{BO}$ is a beat frequency and $\Phi_O$ is a phase offset,
   wherein $f_{BO}[n]=k\tau_O$, and $\Phi_O=2\pi f_0 \tau_O + k\pi\tau_O^2$, and
   wherein $\tau_O$ is the delay of the artificial radar target, k is the ratio of bandwidth and duration of chirps, and $f_0$ a starting frequency of the chirps composing the RF oscillator signal.

5. The radar device of claim 1, wherein, to generate a cancellation signal, the digital signal processing circuitry is configured to:
   calculate a noise gain for the estimated phase noise signal.

6. The radar device of claim 5, wherein, to generate a cancellation signal, the digital signal processing circuitry is further configured to:
   apply the noise gain to the estimated phase noise signal;
   calculate the cancellation signal with a beat frequency and a phase associated with an undesired object located in the radar channel at a distance from the radar device;
   calculate the cancellation signal based on the beat frequency, a gain associated with the undesired object, and the phase noise signal.

7. The radar device of claim 1, wherein the analog-to digital conversion circuitry is configured to sample the down-converted first RF radar signal and the down-converted second RF radar signal in accordance with a sampling clock,
   wherein the down-converted first RF radar signal is sampled temporally delayed by a sampling delay with respect to the down-converted second RF radar signal.

8. The radar device of claim 7, wherein the sampling delay depends on the delay of the artificial radar target and a round trip delay time of an undesired object located in the radar channel at a distance from the radar device.

9. A method for cancelling noise in a radar signal, the method comprising:
   transmitting an RF oscillator signal to a radar channel and receiving a respective first RF radar signal from the radar channel;
   applying the RF oscillator signal to an artificial radar target composed of circuitry, which applies a delay and a gain to the RF oscillator signal to generate a second RF radar signal;

down-converting the first RF radar signal and the second RF radar signal from a RF frequency band to a base band;

digitizing the down-converted first RF radar signal and the down-converted second RF radar signal to generate a first digital signal and a second digital signal, respectively;

estimating a phase noise signal included in the second digital signal, the phase noise signal approximating phase noise in the radar channel associated with short-range leakage;

generating a cancellation signal based on the estimated phase noise signal; and subtracting the cancellation signal from the first digital radar signal to obtain a noise compensated digital radar signal.

10. The method of claim 9, wherein estimating a phase noise signal comprises:

calculating an estimation of the phase noise signal dependent on the gain and the delay of the artificial radar target and dependent on signal parameters of the RF oscillator signal.

11. The method of claim 10, wherein the RF oscillator signal is a sequence of chirps and the signal parameters of the RF oscillator signal are a start frequency, a bandwidth, and a duration of the chirps.

12. The radar of claim 1, wherein the artificial radar target provides an adjustable gain and an adjustable delay to the RF oscillator signal to generate the second RF radar signal.

13. The radar of claim 12, wherein the approximation of the phase noise in the radar channel included in short-range leakage is performed by scaling and time-shifting the RF oscillator signal in accordance with the adjustable gain and the adjustable delay provided by the artificial radar target.

14. The radar device of claim 13, wherein the digital signal processing circuitry is configured to determine the scaling of the RF oscillator signal in accordance with the adjustable gain based upon a cross-covariance function.

15. The radar device of claim 7, wherein the sampling delay applied to the down-converted first RF radar signal is selected to yield a cross-correlation coefficient that exceeds a threshold value.

16. The radar device of claim 15, wherein the cross-correlation coefficient is indicative of a level of correlation between phase noise included in the short-range leakage and phase noise included in the second digital signal.

* * * * *